United States Patent
Liao

(10) Patent No.: US 8,234,424 B2
(45) Date of Patent: Jul. 31, 2012

(54) EFFICIENT STRIP-DOWN AND RE-ALIGNMENT OF INGRESSING PHYSICAL LAYER/DATA LAYER PACKETS IN AN AGGREGATED PCI-EXPRESS PORT HAVING EIGHT LANES

(75) Inventor: Jiann Liao, Campbell, CA (US)

(73) Assignee: Integrated Device Technology, inc., San Jose, CA (US)

( * ) Notice: Subject to any disclaimer, the term of this patent is extended or adjusted under 35 U.S.C. 154(b) by 1366 days.

(21) Appl. No.: 11/450,899

(22) Filed: Jun. 8, 2006

(65) Prior Publication Data

US 2008/0123638 A1 May 29, 2008

(51) Int. Cl.
*G06F 13/12* (2006.01)
*G06F 13/38* (2006.01)
(52) U.S. Cl. .......................... 710/62; 370/389
(58) Field of Classification Search .................... 710/62, 710/100; 370/389
See application file for complete search history.

(56) References Cited

U.S. PATENT DOCUMENTS

| | | | | |
|---|---|---|---|---|
| 5,016,162 A | * | 5/1991 | Epstein et al. | 710/242 |
| 6,901,000 B1 | * | 5/2005 | Ichiriu et al. | 365/49.17 |
| 7,305,047 B1 | * | 12/2007 | Turner | 375/316 |
| 7,539,801 B2 | * | 5/2009 | Xie et al. | 710/104 |
| 2003/0018837 A1 | * | 1/2003 | Hussain et al. | 710/22 |
| 2005/0144339 A1 | * | 6/2005 | Wagh et al. | 710/36 |
| 2007/0214301 A1 | * | 9/2007 | Chen | 710/301 |

* cited by examiner

*Primary Examiner* — Chun-Kuan Lee
*Assistant Examiner* — Brooke Taylor
(74) *Attorney, Agent, or Firm* — Tracy Parris

(57) ABSTRACT

In PCI-Express and alike communications systems, number of lanes used per channel or port can vary as a result of negotiated lane aggregation during network bring-up. Disclosed are systems and methods for efficiently realigning packet data and stripping out control bytes in a by-eight port configuration as the packet data ingresses from the physical layer (PL), past the data link layer (DL) and into the transaction layer (TL). It is shown that data routing can be reduced to just two, mux-selectable permutations based on whether the STP (start of packet) character arrives in an even numbered double-word side (DW0) or an odd-numbered double-word side (DW1) of a physical layer register.

16 Claims, 8 Drawing Sheets

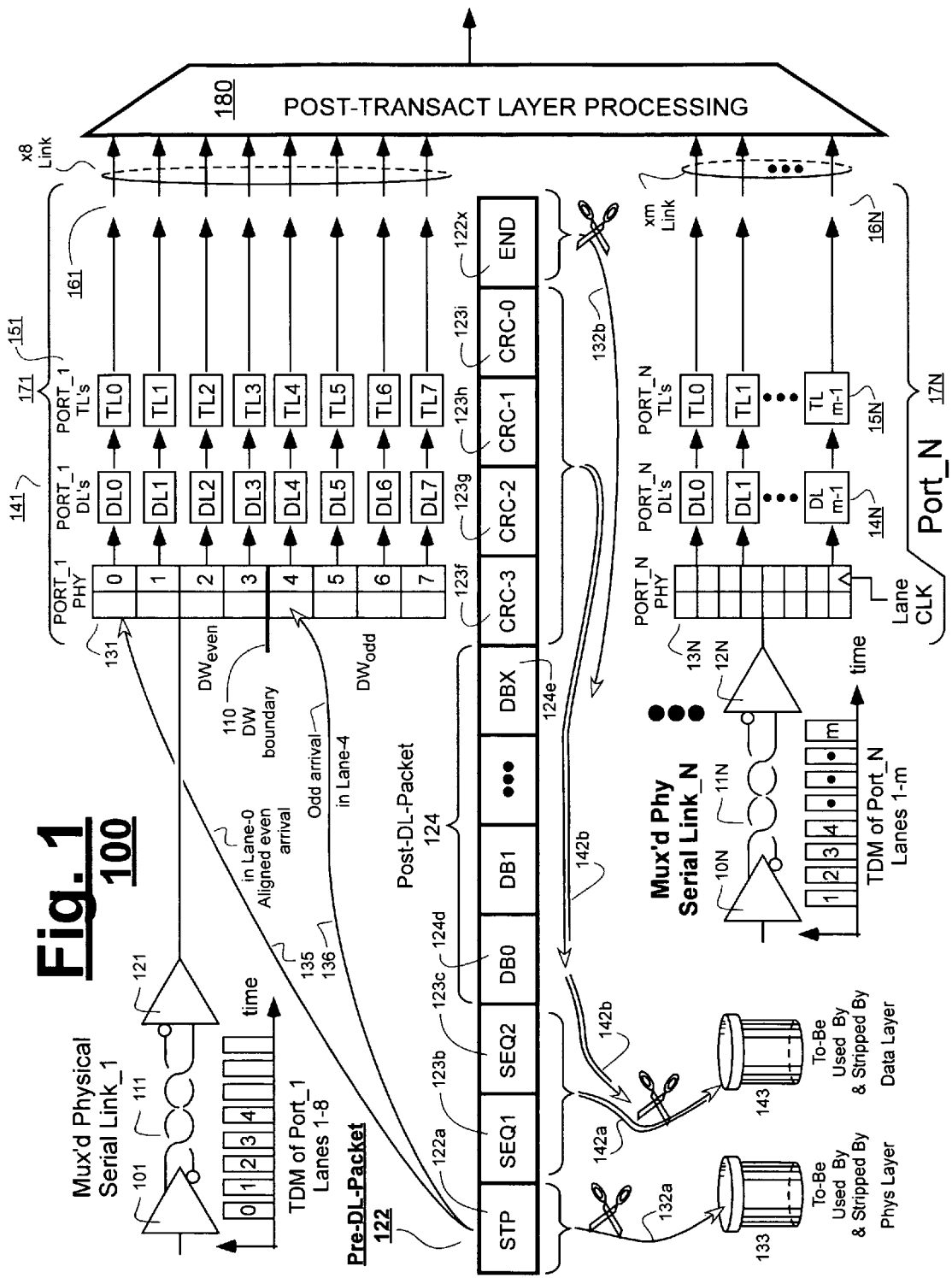

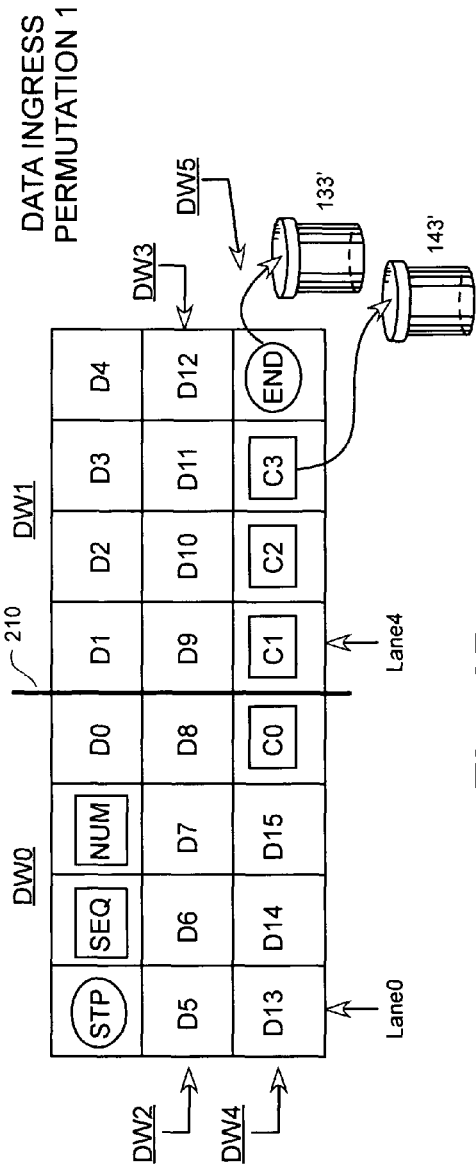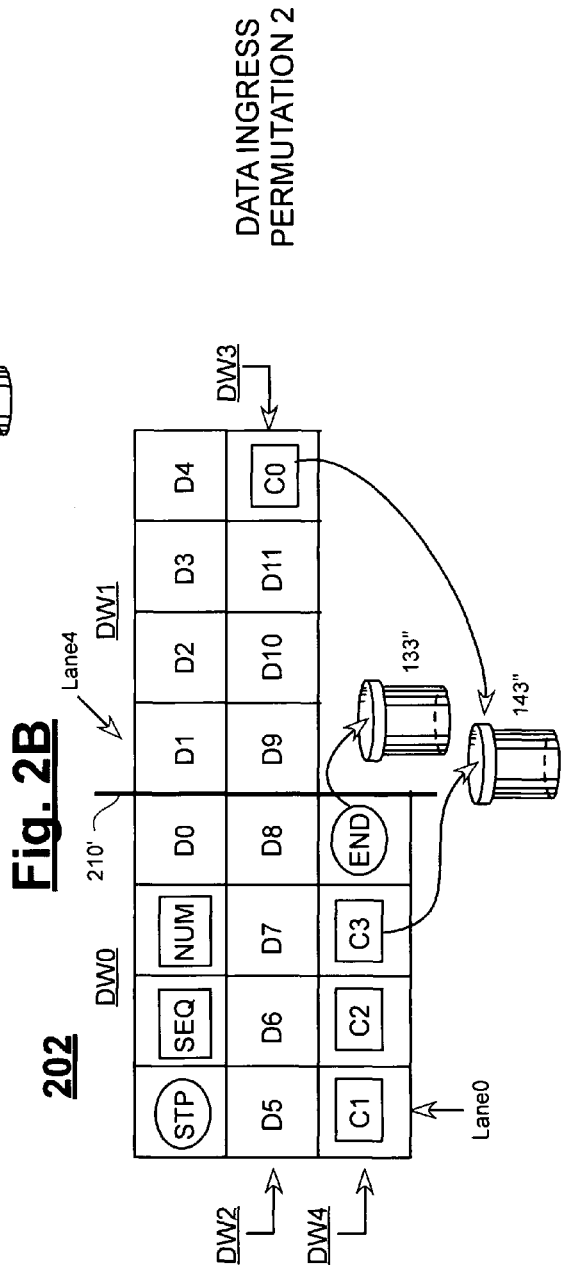

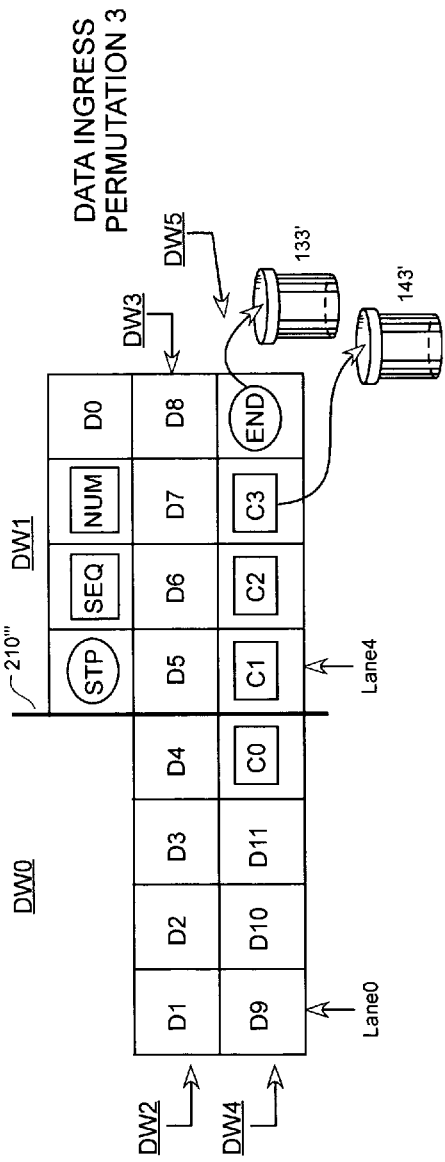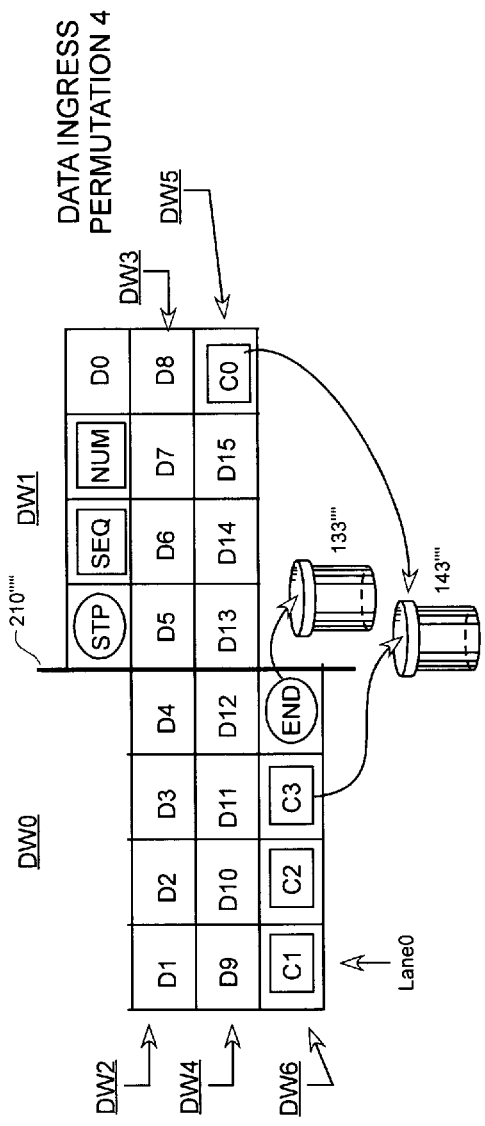

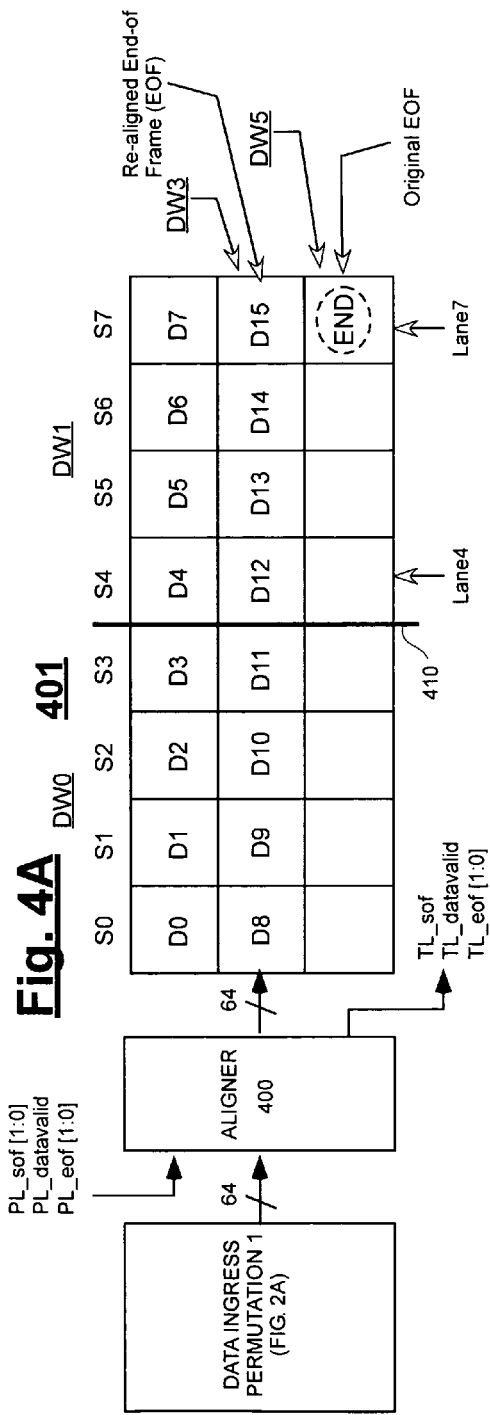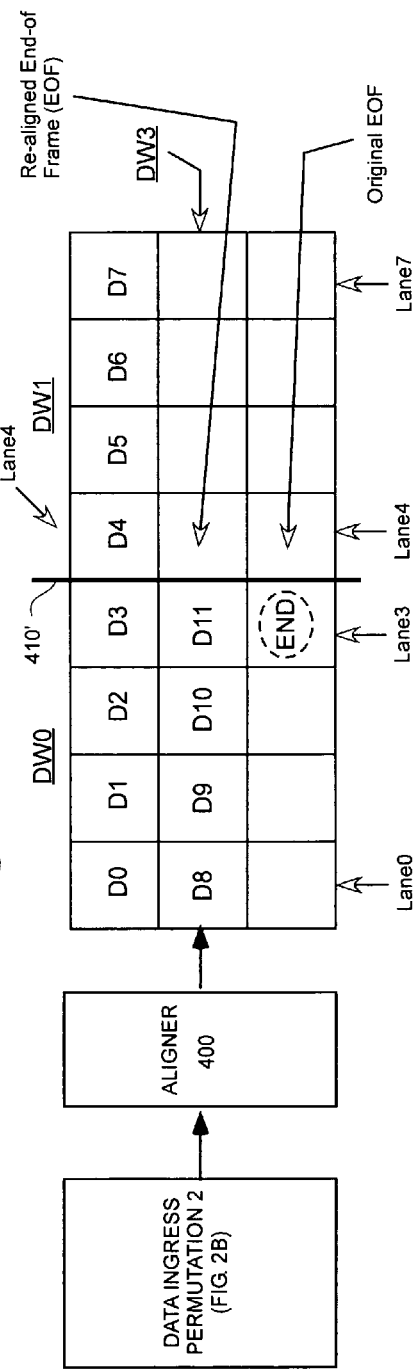

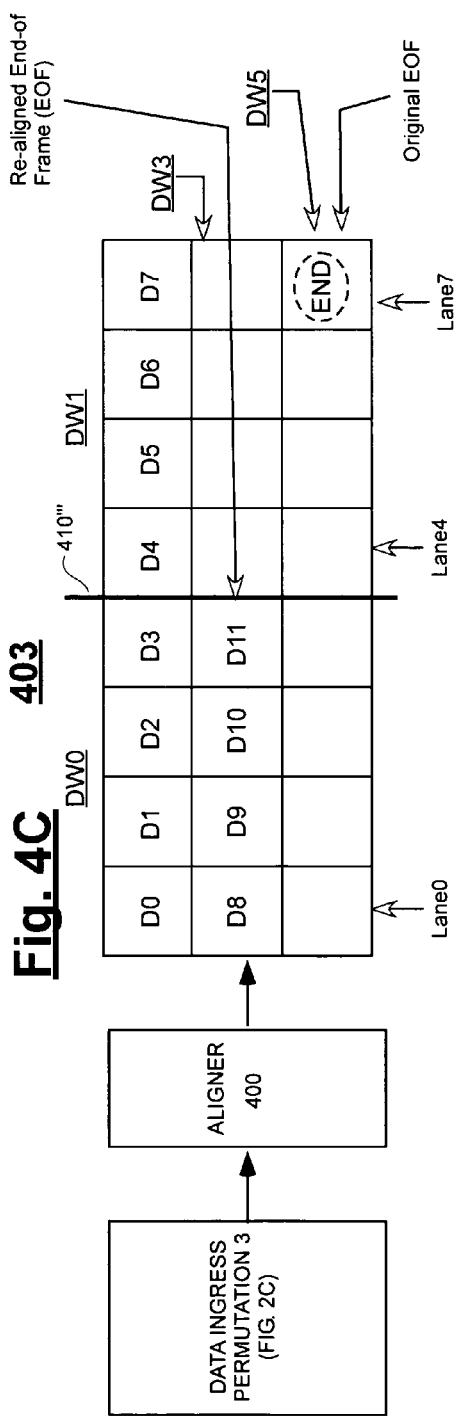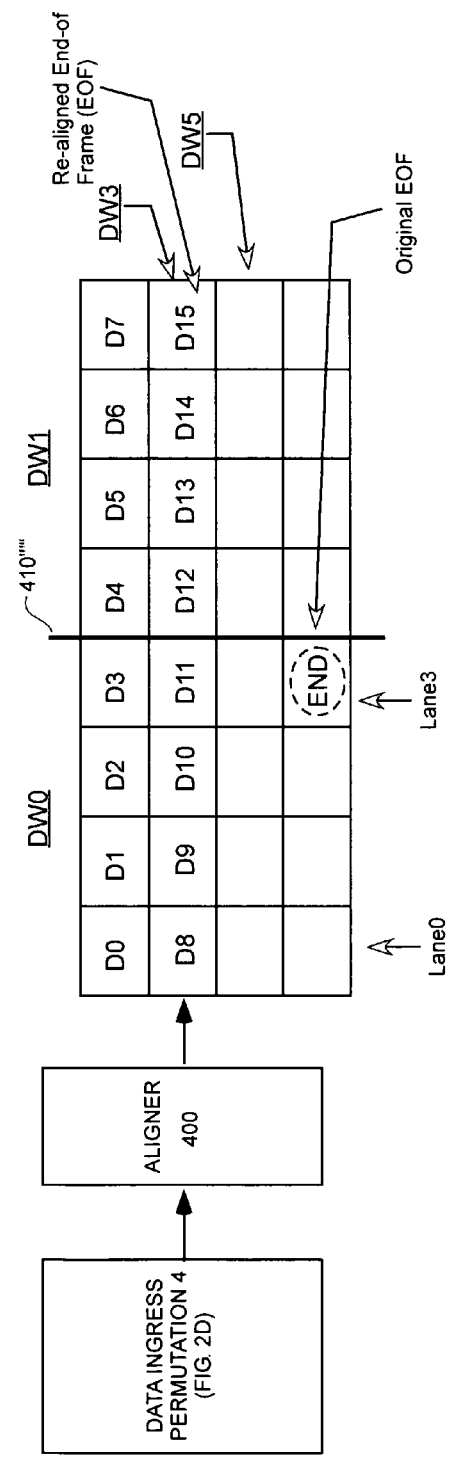

EFFICIENT STRIP-DOWN AND RE-ALIGNMENT OF INGRESSING PHYSICAL LAYER/DATA LAYER PACKETS IN AN AGGREGATED PCI-EXPRESS PORT HAVING EIGHT LANES

FIELD OF DISCLOSURE

The present disclosure of invention relates generally to networks that exchange information in packet format. The disclosure relates more specifically to systems that strip down ingressing packets as they pass successively through a physical layer (PL), a Data Link layer (DL) and enter a Transaction Layer (TL) for further processing therein. One particular embodiment is directed to the PCI-Express data exchange protocol.

DESCRIPTION OF RELATED ART

The use of digitally-encoded packets in data communication systems is well known. Typically each packet is layered like an onion to have header-type outer shell sections, a payload core section and one or more error correction sections that cover various parts of the core or outer shells. Packets may be transmitted individually or as parts of relatively continuous streams or bursts depending on quality of service requirements and/or availability of transmission links. When packet signals are transmitted from a source device to a receiving device, the packet signals that arrive at the receiving device typically progress through a physical interface layer (PL), and then through one or both of a data link layer (DL) and a transaction layer (TL). The physical interface layer (PL) may include means for serializing and deserializing data (SERDES) and means for recognizing the start and end of each ingressing packet. The data link layer (DL) may include means for managing error checking, error correction (e.g., ECC, CRC) and/or packet sequencing and completion of sequences of interrelated packets. The transaction layer (TL) may include means for parsing (peeling the onion skin layers of) different parts of each kind of post-DL packet so as to get to desired portions of the payload data. Payload data from sequentially ingressing packets may sometimes need to be reordered for purposes of reconstructing an original data sequence different from the ingress sequence, where the original data sequence may, for example, be required for reconstituting a rasterized graphic image. Packet signals leaving a source device typically progress in the reverse order, namely, first by moving outgoing payload data through the transaction layer (TL) for attachment of transaction control code, then through the data link layer (DL) for attachment of error check code thereto and finally through the sender's physical interface layer (PL) for encoding into a serial transmission format and output onto a physical transmission media (e.g., a high frequency cable or printed circuit strip).

As mentioned, packet data that is ingressing into a receiving device typically passes successively through the PL, DL and TL layers for dedicated and successive processing of different parts of the ingressing packet in each layer. Because the original, pre-PhysL data is often of a serial form, it can arrive in different alignment states relative to a data-framing paradigm of memory used in the receiving device. More specifically, in one device of interest, packet data is mapped into PL memory (e.g., PL registers) as double words (DW's), where each double word consists of two words, each word consists of two bytes and each post-deserialization byte consists of 8 bits. If a lead payload byte (e.g., Data Byte DB0) of a given data stream arrives serially into the device in misalignment with the double word (DW) boundaries of the device's internal memory systems, the data may have to be re-aligned a number of times before it can be properly processed. This often happens in the case where optically-encoded data is first synchronized according to a non-payload synchronization symbol (e.g., STP) when first decoded and first stored in a PL memory means (e.g., a PL pipeline register). Typically, the start-of-packet character (STP) of each decoded packet is recognized and placed in a lead memory address position by circuitry of the physical layer (PL). The STP character is afterwards conventionally stripped off, the data is re-aligned a first time to account for the stripped away STP code and the once-stripped data is then submitted to the data link layer for further successive processing. In the data link layer (DL), other non-payload characters such as error check (e.g., CRC bytes) and sequence number characters are typically processed and stripped away. Before being submitted to the transaction layer (TL), the twice-stripped packet is conventionally re-aligned a second time by the data link layer to thereby synchronize its payload data with addressing protocols used for memory of the transaction layer. Proper alignment of valid data bytes in respective memory word slots is often required before the payload data can be further processed by the transaction layer (TL).

While the just described steps of repeatedly stripping off packet bytes and re-aligning the remaining bytes may not seem like a matter for great concern, it should be observed that this process applies to all ingressing, payload-carrying packets. In other words, in most systems, every one of hundreds or larger numbers of packets per second are conventionally treated in this brute force, double-strip and double-re-align manner. Such a more-than-once realignment of data consumes energy for each re-alignment step, consumes system resources for each re-alignment step and increases processing latency for getting the payload data into the transaction layer in properly aligned format. It is shown below that a method exists for reducing the number of per-packet realignments to just one re-alignment step for one type of port configuration known as a by-eight (×8) lane aggregation.

Lane aggregation is a feature provided in a number of newer communication protocols that have started gaining favor in the industry. Lane aggregation allows each of plural data ports to have a different, programmably set or dynamically established data rate depending on network conditions. Such flexibility allows for more efficient use of limited resources and graceful recovery from loss of one of plural, data carrying lanes. Included among the emerging protocols are the PCI-Express™ protocol and the HyperTransport™ protocol. Under PCI-Express, one logically-configured communication channel may be programmably or dynamically formed as an aggregation of many, relatively slow sub-channel resources (i.e., PCI-Express lanes) while another logically-configured channel may be variably formed to have one or just a few, such slow or basic sub-channel resources (i.e., lanes). The data bandwidth of the channel containing a greater number of basic sub-channel resources will generally be larger than the data bandwidth of the channel having just one or few sub-channel resources aggregated together. A trade off may be made between number of sub-channel resources consumed per communication channel and the bandwidth of each such channel. In the realm of PCI-Express™, the aggregated variable bandwidth channel resources are sometimes referred to as logical "ports" or "links" and the lowest common speed, sub-channel resource at the physical layer level is often referred to as a "lane". Lanes may be selectively aggregated together in larger or smaller numbers to thereby respectively define higher or lower speed ports in PCI-Express systems. Ports may thereafter be selectively bifurcated to define larger numbers of virtual channels per port albeit with lower bandwidths per channel.

When a PCI-Express™ network is being adaptively configured or re-configured during network bring-up or reboot, the associated software determines how many lanes (subchannel resources) to assign to each PCI-Express™ "port" or PCIe logical "link" (the terms PCIe port and PCIe link are sometimes used interchangeably) so as to thereby define the maximum data rate supported by that port. For example, a first PCIe port may be programmably configured (e.g., during network boot-up) to consist of an aggregation of 8 basic hardware lanes with a lowest common bandwidth per lane of 2.5 Gb/s (Giga-bits per second) thus giving the ×8 first Port an aggregated bandwidth of 20 Gb/s. That first port can support a corresponding single channel of 20 Gb/s bandwidth or multiple virtual channels with lower bandwidths that can add up to as much as 20 Gb/s. At the same time, a second PCIe port can be programmably configured during the same network boot-up to consist of an aggregation of just 4 basic lanes, thus giving that ×4 second Port an aggregated bandwidth of 10 Gb/s. A third PCIe port can be programmably configured during the same network boot-up to consist of just one lane; thus giving that ×1 Port a bandwidth of just 2.5 Gb/s. In a subsequent boot-up, the first through third ports may be reconfigured differently due to flexible resource negotiations that can take place during each network bring up or reconfiguration.

The ×8 configuration situation occurs often. It turns out that a particular data processing efficiency can be realized for the ×8 configuration in regards to the strip-down and re-alignment of Ingressing Physical Layer/Data Layer packets.

SUMMARY

A packets receiving device in accordance with the present disclosure includes means for detecting a by-eight (×8) lane aggregation condition for a given port and for responsively activating a one-step, strip-down and re-alignment circuit for processing ingressing Physical Layer (PL) packets of that given port so that after the one-step strip-down and re-alignment, the packets arrive in aligned format into the Transaction Layer (TL) of the given port for further processing.

When the ×8 configuration is present, deserialized data can arrive in one of two basic states into physical layer memory, the first being where after conversion from 10 bits per character format to 8 bits per character format, the start-of-packet character (STP) aligns with the start of an even double word (DW0) side of a PL register, and the second being where the STP aligns with the start of an odd double word side (DW1) of the PL register. The desired end result for both situations is to have the start-of-packet character (STP) stripped away, to have a subsequent plurality of sequence bytes (SEQ1, SEQ2) processed and stripped away and to have a subsequent plurality of data bytes (D0-Dx) realigned to conform to a memory addressing framework of the transaction layer (TL) before this plurality of data bytes (D0-Dx) is further processed by the transaction layer (TL). One embodiment in accordance with the invention comprises means for recognizing the ×8 configuration condition for a given port and means for responsively activating a strip-and-align circuit for that port where the strip-and-align circuit has two modes: one for handling packets whose start-of-packet character (STP) aligns with the start of an even double word (DW0) in the PL memory and the second for handling packets whose STP aligns with the start of an odd double word (DW1) in the physical layer (PL) memory.

A machine-implemented method is provided in accordance with the invention for more efficiently stripping and realigning packets by first testing to see if a currently-being-serviced, ingress port (link) has a ×8 lane configuration and if yes, second determining if the start-of-packet character (STP) of each ingressing data packet is disposed in an even-numbered double-word (e.g., DW0) of a physical layer memory or an odd-numbered double-word (e.g., DW1). A first routing pattern and delaying pattern for some bytes is employed if the second determination indicates an even disposition and a different, second routing pattern and delaying pattern for some bytes is employed if the second determination indicates the odd disposition.

Other aspects of the disclosure will become apparent from the below detailed description.

BRIEF DESCRIPTION OF THE DRAWINGS

The below detailed description section makes reference to the accompanying drawings, in which:

FIG. 1 is a block diagram of a packet receiving system having one or more programmably configurable ports feeding into a common, post strip-down processing core;

FIGS. 2A-2D are schematic diagrams of four permutations in which PCI-express data can arrive into the physical layer (PL) memory of a ×8 configured port;

FIGS. 4A-4D are schematic diagrams of four permutations according to which the original END character and corresponding, post-strip end-of-frame data byte may place relative to one another as a result of strip and realign functions.

DETAILED DESCRIPTION

Figure 3A:
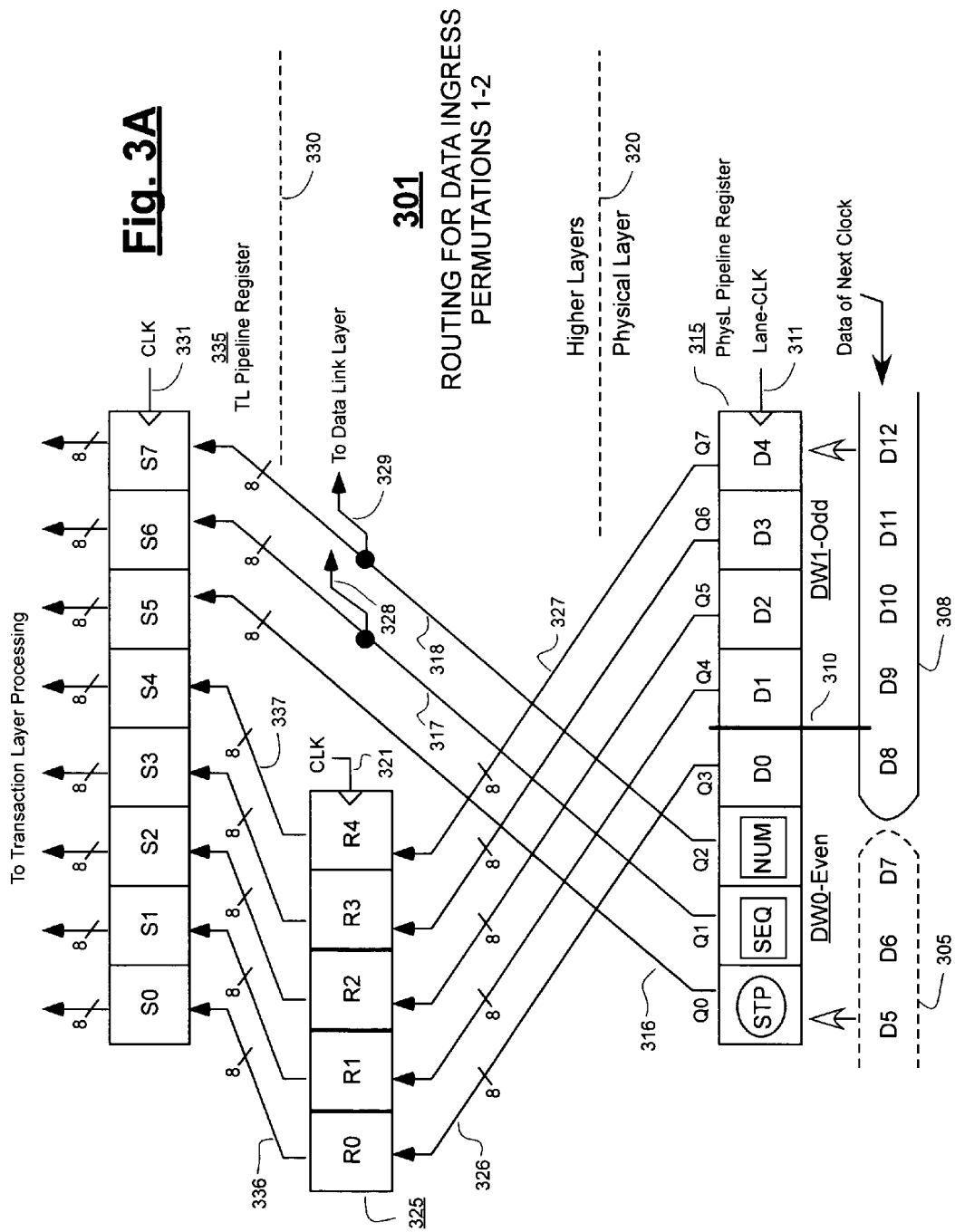
FIG. 3A is a schematic diagram of a first strip and align circuit that can handle packets whose start-of-packet character (STP) aligns with the start of an even double word (e.g., DW0) in the physical layer (PL)

Referring to FIG. 1, shown is a device 100 (e.g., a monolithic integrated circuit) that may be included in a PCI-express™ network. Device 100 may be multiported, such as for implementing an in-network switching unit, or single ported such as for implementing an end-point device in a switched packet network. In the illustration, a multiplexed first serial physical link such as 111 couples a high frequency source amplifier 101 to a corresponding receiving amplifier 121 of the device 100. (The illustrated multiplexed serial physical link 111 is merely conceptual and may be implemented by use of plural twisted wire couplings rather than just one. It may include use of optical media as well as electrical media.) Multiple channels of data may be transmitted over the first multiplexed serial physical link 111 by use of one or more forms of signal multiplexing. Time domain multiplexing (TDM) may be used for example, on the physical serial link 111 for mixing together the data of a number of sub-channels or "lanes" of data as they are called in PCI-express so as to define an aggregated logical channel of data flowing into a corresponding logical "port" or PCI-Express "link" 171. In the example of multiplexed serial physical link 111 and its corresponding, first ingress port 171, system configuration operations have created an aggregation of eight lanes numbered 0-7, with each post-SERDES lane effectively constituting a one byte (B) wide parallel lane. A physical layer interface portion 131 (PHY) of PORT_1 (which port is also identified as port 171) receives the serially transmitted signals of multiplexed link 111 (e.g., a differential and optically encoded signal (i.e., 10 bits per character optical encoding) that is sent over a complementary twisted wire pair) and converts the received, serial data into eight parallel data flows of 8 bit encoded data that respectively flows into respective Data Link layer sections DL1, DL2, DL3 . . . , DL7 of column 141 in step with a corresponding lane clock (Lane CLK).

Before continuing with further details of FIG. 1, some background on PCI-Express may be in order at this point, particularly as it applies to negotiated lane aggregation and/or port bifurcation. The more standard, PCI bus is a well known form of standardized signal interchange within the field of digital computer and communication system design. One lesser known extension of the PCI bus standard is referred to as PCI-X. An emerging, but not as yet, well known extension of these is referred to as PCI-Express. The three should not be confused with one another. The present disclosure is mostly directed to the industry-defined, PCI-Express protocol but can also be applied to other serial link protocols that support variable lane aggregation such as HyperTransport™ (see http://www.hypertransport.org) for example.

PCI-Express is further characterized by its use of high speed serial links and of packets structured to move through such high speed serial links. Like other communication standards, the PCI-Express protocol has a layered architecture that includes (1) a Physical signaling layer, (2) a Data link layer and (3) a Transaction layer. The Physical signaling layer of PCI-Express is typically characterized by use of a Low-Voltage Differential Signaling (LVDS) high-speed serial interface specified for 2.5 GHz or higher signaling per lane, while further using 8B/10B or like link encoding and using AC-coupled differential signaling. A complementary set of LVDS pairs is sometimes referred to as a physical link. The PCI-Express standard allows for re-configurable lane combinations within each port so as to thereby form different numbers of wider (faster) or narrower (slower) communication ports designated as x1, x2, x4 and so on up to x32; where the x1 configuration of a given port is the slowest (narrowest) and the x32 configuration is the fastest (widest). Multi-lane links can provide for higher bandwidth communication capabilities than can a comparable single-width link that has long dead times. The Data link layer of the PCI-Express protocol is typically characterized by packet exchange standards that govern how packets route between neighboring PCI-Express entities and over its single or multi-lane highways while assuring data integrity and providing for sequence checking, along with packet acknowledgments and flow control. The Transaction layer of the PCI-Express protocol is typically characterized by standardized rules for translating data read and/or write requests as they move through switching nodes between an intelligent host and one or more endpoint devices.

There is much to the PCI-Express standard that is beyond the scope of the present disclosure. More information about the standard may be obtained via the internet from the PCI Special Interest Group at: http://www.pcisig.com/specifications.

Returning now to the specifics of FIG. 1, an example of a post-SERDES but pre-DL packet (a not-yet-stripped packet) is shown at 122. The illustrated pre-DL packet 122 can contain the following sequence of successive bytes when implemented according to the PCI-Express protocol: First, a start-of-packet (STP) synchronizing character 122*a*—one that has been converted from a unique optically-encoded serial format (e.g., a 10 bit optical format) that indicates start of packet into a corresponding parallel data format (e.g., 8 bits per character format). Following the STP character are: two sequence number bytes 123*b*-123*c* intended for processing by the DL layer, and then a lead data byte (DB0) 124*d* intended for processing by the TL layer. This is followed by next successive data bytes (DB1-DB*x*) also targeted for processing by the TL layer. Immediately after the last TL-targeted, payload byte (DB*x*) 124*e*, there is provided a succession of four cyclical redundancy check bytes (CRC3-CRC0) 123*f*-123*i* intended for processing by the DL layer, and finally an end-of-packet (END) synchronizing character 122*x* whose optically-encoded counterpart is intended for use by the physical layer (PL). Like the STP character, the END character was originally in optically-encoded serial format (e.g., 10 bit format) where it could be uniquely distinguished from other packet characters for locating the end of the not-yet-stripped packet 122 and thereafter the END character has been converted into parallel data format (e.g., 8 bits per character format) where it may no longer be uniquely distinguishable from other 8 bit encoded characters. The physical interface layer (PL) can, however, keep track of the location of the STP and/or END characters in memory as they progress through the PL layer and towards the data link layer (DL).

On rare occasion, a so-called EDB character (End of Bad Data) is substituted for the END character when an upstream means in the network path has determined that the packet contains bad or suspect data irrespective of what the CRC error check indicates for the same data. In such a case, payload data for the packet should be nullified in response to the presence of EDB character just as it would be nullified (have its validity overridden or cancelled) in the case where error check (e.g., CRC) indicates for the same data contains an error. It is to be understood that discussion herein regarding detection of the END character is to be taken as incorporating a possible detection of the alternately insertable EDB character even if EDB is not explicitly mentioned. EDB is not routinely seen in the data stream and therefore mention of it is generally omitted herein.

After appropriate error checking of CRC bytes 123*f*-123*i* takes place in the DL column 141, the respectively ingressing signals of the 8 lanes continue in lock step with the lane clock to progress into transaction layer (TL) column 151 of Port_1 for transaction level processing. With every cycle of the lane clock (see item 13N of FIG. 1), a next block of eight bytes (two double-words) of data advances from the DL layer 141 into the TL layer 151. For proper processing to take place in the transaction level, however, the lead data byte (DB0) 124*d* of each ingressing data packet should arrive aligned with the lead spot of the even double word side (DW0) of TL memory. In other words, aligned with the byte forwarding path (TL0) associated with lane 0.

Scissor symbols 132*a*, 132*b* are employed in FIG. 1 as well as a first trash can symbol 133 for schematically representing a desired first strip-off and utilize action to be applied to the STP byte 122*a* and to the END byte 122*x* by circuitry of the physical interface layer (PL). The Phys Layer 131 uses the STP and END symbols in their optically-encoded form for delineating the start and end of the embraced, other bytes 123*b* through 123*i* in each ingressing data packet 122. FIG. 1 further schematically shows the desired use and strip-off of the SEQ1, SEQ2 bytes 123*b*-123*c* and the CRC bytes 123*f*-123*i* by the data link layer (DL) where this use is represented by means of scissor symbols 142*a*, 142*b* and the second trash can symbol 143. The remaining, post-DL packet bytes 124 need to be shifted into alignment with lane 0 of the transaction layer (TL) column 151 so that the TL layer can then properly process the remaining data bytes 124.

In one embodiment, after TL processing occurs, the TL processed data words (e.g., bytes) may be temporarily stored in respective data buffers which could be inserted at the position of column 161 in the drawing. The buffers 161 may then feed into a post-TL processing core 180 such as an ingress data multiplexer. In one embodiment, the device 100 may be a multiported switching device. In another embodiment, device 100 may be a single port, end-leaf device within a network having multiported switches that route data to (and/or from) the end-leaf device.

At the same time that serialized data is flowing into the by-eight configured Port_1 (171) of device 100 at a respective first data rate (which rate is established by aggregating the eight lanes together to define Port_1 171), other serialized data may be flowing into Ports 2 through N (only the Nth port 17N is shown) of the same or other data receiving devices in the network at respective second through Nth aggregation-defined data rates, which can be the same or different from the first data rate. In the illustrated example, the Nth port (e.g., N≧2) in the series, 17N is configured to receive an aggregation of m lanes of data (a by-m logical link) from physical link 11N, where m is an integer at least in the range 1-32. Physical layer 13N deserializes the data into data link sections DL0 through DL(m−1) of column 14N. The data continues in lock step with the lane clock (CLK) through transaction layer 15N and into post-TL buffers (not shown) such as may be provided in column 16N. The outputs of the buffers may then feed into the core ingress processor 180. Under standard PCI-Express protocol, m, the number of lanes that may be aggregated into a single port is an integer in the range 1 to 32. In some subset embodiments, m may be restricted to a lesser range such as 1 to 16. In either case, formation of one or more ×8 links in single-ported or multi-ported devices such as 100 is not uncommon during system usage.

When a ×8 configuration is formed, it turns out that the physical layer 131 positions the start-of-packet (STP) byte 122a into either its lane-0 or its lane-4. (The boundary 110 between lane-3 and lane-4 defines a double word boundary between the even side double-word, $DW_{even}$ and the odd side double-word, $DW_{odd}$.) Thus, in so far as placement of the STP byte 122a is concerned there are only two possible, post-SERDES arrival states for each ingressing packet 122 that arrives in a ×8 configured port 171. The first arrival state is designated here as a Lane-0 aligned state and is signified by arrival path 135. The second arrival state is designated here as a Lane-4, mis-aligned state and is signified by arrival path 136. Also, as will be explained later, there are only two possible arrival states for placement of each END byte 122x, in lane 3 or in lane 7.

Referring to FIG. 2A, a first permutation of the Lane-0 aligned state is shown in memory address grid 201. The STP byte places in the lead byte position of PL memory word DW0 in this example. A plurality of sequence bytes (two in the case of PCI-Express) follow the STP byte in successive placement within the first PL memory word, DW0. The first TL-targeted data byte, D0 places in the tail byte position of DW0, just before double-word boundary line 210. The next successive and TL-targeted data bytes D1 through D4 are placed into the next successive, odd-numbered double word, DW1 of the PL memory means. Payload data bytes D5 through D8 are placed into the next even-numbered double-word, DW2. Payload data bytes D9 through D12 are placed into double-word DW3. Payload data bytes D13 through D15 are placed into double-word DW4 followed by error check byte C0 in the tail byte position of even double-word, DW4. The END-of-packet symbol byte (could be an EDB symbol instead) places in the tail byte position (lane 7) of DW5. Oval encircled bytes in FIG. 2A are intended to be used by the physical layer and then stripped off. Rectangle bounded bytes are to be used by the data link layer (DL) and then stripped off. Before the remaining payload data bytes D0-D15 can be handed off to the transaction layer (TL) for further processing, the remaining data bytes D0-D15 need to be shifted so that the D0 byte places in the lead byte position (lane 0) of a TL-used, memory double-word, DW0' (not yet shown). It should be noted here that the first arrival permutation 201 is characterized by initial placement of the STP byte at the head of an even double-word (e.g., DW0) in the physical layer memory and by the initial placement of the END byte at the tail of a subsequent odd double word (e.g., DW5). The actual number of data bytes in the post-DL payload subset, D0-D15 does not have to be sixteen. The PCI-Express protocol allows any number in the range 3 bytes to 4,104 bytes to be inserted in the post-DL packet field. Dummy data bytes may be padded to the end of a post-DL data subset (e.g., D-D15) so that the END byte places at the tail of the last odd-numbered double-word (e.g., DW5).

Referring to FIG. 2B, a second arrival permutation for the Lane-0 aligned state 136 is shown in grid 202. The STP byte again places in the lead byte position of an even PL memory word, DW0. However, unlike first permutation 201, the END byte places at the tail (lane 3) of the last even-numbered double-word (e.g., DW4). That means that check byte C0 will be stripped from the tail of the last odd-numbered double-word (e.g., DW3) and check bytes C1-C3 will be stripped from the front of the last even-numbered double-word (e.g., DW4). Once again, the actual number of data bytes in the post-DL payload subset D0-D11 does not have to be twelve. The PCI-Express protocol allows any number in the range 3 bytes to 4,104 bytes. Dummy data bytes may be padded to the end of the post-DL subset (e.g., D0-D11) so that the END byte places at the tail of the last even-numbered double word (e.g., DW4) if permutation number 202 is being processed.

Referring to FIG. 2C, a first permutation of the Lane-4 mis-aligned arrival state is shown in grid 203. The STP byte places in the lead byte position of an odd PL memory word, DW1. Payload data byte D0 places in the tail byte position of DW1. Payload data bytes D1 through D4 are placed into the next even-numbered double-word DW2. Payload data bytes D5 through D8 are placed into odd double-word DW3. Payload data bytes D9 through D11 are placed into even double word DW4 followed by error check byte C0 in the tail byte position of DW4. The END-of-packet symbol byte places in the tail byte position of the last, odd-numbered double word, e.g., DW5. The third arrival permutation 203 is thus characterized by initial placement of the STP byte at the head of odd PL double-word DW1 and by the initial placement of the END byte at the tail of a subsequent odd double-word, e.g., DW5. The actual number of data bytes in the post-DL payload subset D0-D11 does not have to be twelve. The PCI-Express protocol allows any number in the range 3 bytes to 4,104 bytes. Dummy data bytes may be padded to the end of the post-DL subset (e.g., D0-D11) so that the END byte places at the tail of the last odd-numbered double word.

Referring to FIG. 2D, another permutation of the Lane-4 mis-aligned arrival state is shown in grid 204. The STP byte again places in the lead byte position of odd PL memory word, DW1. However, unlike third grid permutation 203, the END byte places at the tail (lane 3) of the last even-numbered double word (e.g., DW6).

FIG. 3A corresponds to FIGS. 2A-2B and shows a first circuit configuration 301 for handling a Lane-0, aligned arrival situation. An 8-bytes wide output register of the physical interface layer (PL) is shown at 315. Its eight byte outputting sectors (8 lanes) are denoted as Q0 through Q7. The STP character is output from the Q0 lane output of register 315 as shown while the D0 data byte is output during the same cycle of the lane clock (311) from the Q3 output byte sector. Sequence bytes 1 and 2 emerge from the Q1 and Q2 output byte sectors. The D1 through D4 data bytes are output during the same cycle of the lane clock respectively from the Q4-Q7 output byte sectors. In the next cycle of the lane clock (311), D5-D7 will respectively emerge from the Q0-Q2 output byte sectors. D8-D12 will respectively emerge from the Q3-Q7 output byte sectors of register 315.

In accordance with the invention, respective byte buses 316-318 advance the Q0-Q2 byte sector outputs directly to respective byte stages S5-S7 of a TL layer register 335. In the same clock cycle, five byte buses in region 326-327 route the respective Q3-Q7 byte sector outputs of register 315 to a respective set of five byte-storing stages R0-R4 of temporary delay register 325. In the next clock cycle, as byte buses 336-337 route the respectively delayed D0-D4 data bytes into TL stages S0-S4, non-delayed data bytes D5-D7 (data group 305) will arrive via buses 316-318 into TL stages S5-S7. At the same time, data bytes D8-D12 (data group 308) will flow into respective byte-storing stages R0-R4 of temporary delay register 325 for a one clock hold-over in that register 325. It may be understood from this that the TL layer register 335 will therefore have a properly aligned assemblage of payload data bytes D0-D7 stored in it one cycle after the STP byte and two SEQ NUM bytes (Q1, Q2) have advanced through. (Incidentally, when the STP and two SEQ NUM bytes advance through, an invalidity or an alike flag is asserted for these advancing through bytes to indicate that they are not intended for use by the transaction layer. Thus the TL circuitry ignores them and they are thus stripped away.) By the time the D0-D7 bytes are signaled as being valid within TL layer register 335, the STP byte and two SEQ NUM bytes will have been stripped away. In a next cycle, the TL layer register 335 will have a properly aligned assemblage of data bytes D8-D15 in it. If D15 is not the end (Dx) of the payload frame, then further data bytes will similarly advance into register 315 in subsequent clock cycles. Buses 328-329 carry the two SEQ NUM bytes (Q1, Q2) into the data link layer for processing therein (e.g., protocol checking) when the two SEQ NUM bytes appear at output sectors Q1 and Q2 at the same time that STP appears at output sector Q0 of physical layer register 315. In one embodiment, the two SEQ NUM bytes are used by the data link layer for managing receipt-of-packet acknowledgement functions. Dashed line 320 shows roughly the boundary between the physical interface layer and the data link layer. Dashed line 330 shows roughly the boundary between the data link layer and the transaction layer. Solid line 310 shows a boundary between the even-numbered and odd-numbered double-words as stored in memory of the physical layer (PL).

Figure 3B:
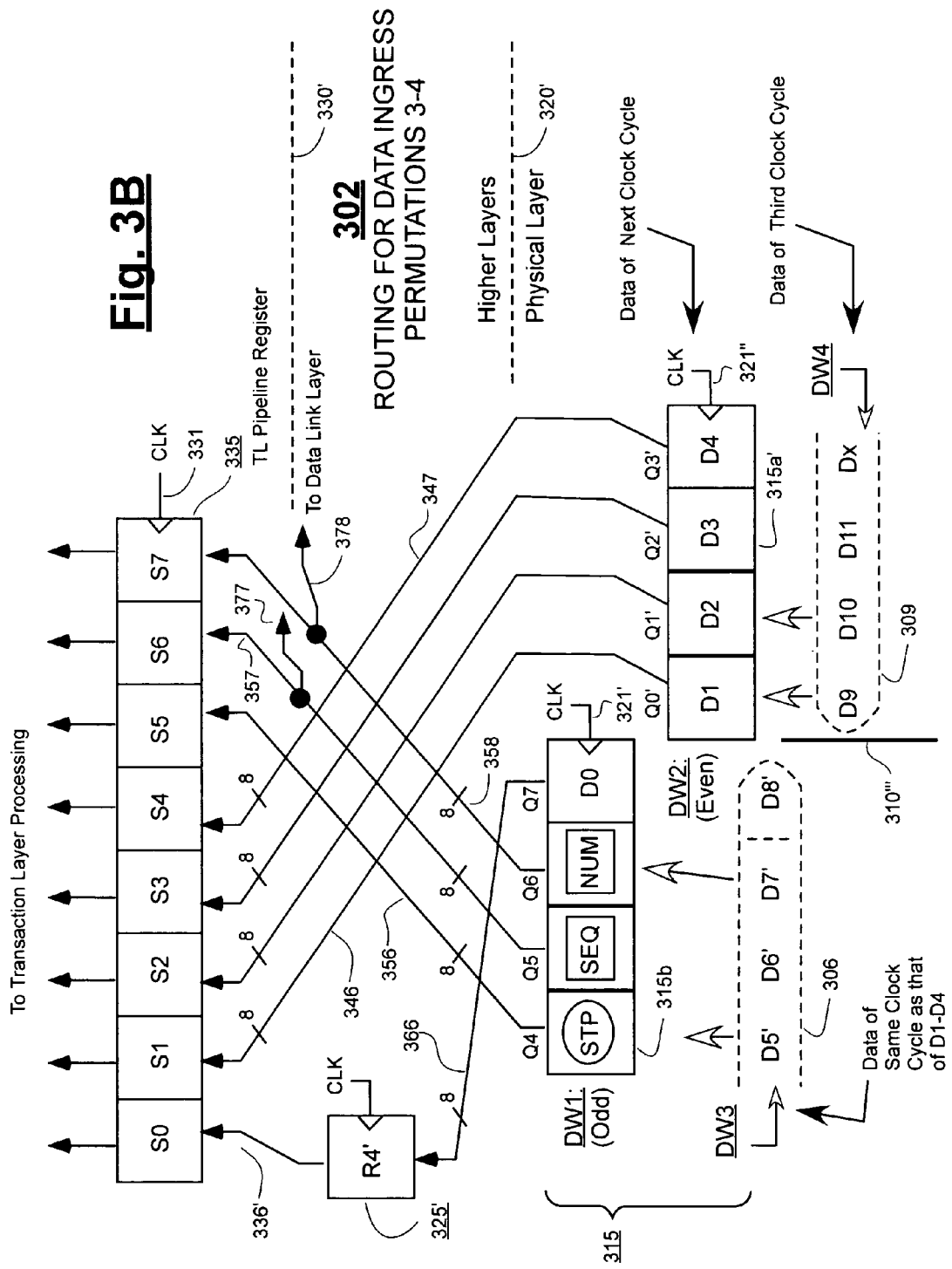
FIG. 3B is a schematic diagram of a second strip and align circuit that can handle packets whose start-of-packet character (STP) aligns with the start of an odd double word (e.g., DW1) in the PL.

FIG. 3B corresponds to FIGS. 2C-2D and shows a second circuit configuration 302 for handling a Lane-4, mis-aligned arrival situation. The same 8 byte output register 315 of FIG. 3A is shown in FIG. 3B except this time it is illustrated as two split apart sections, 315a' and 315b, where section 315b contains the odd PL double-word data (STP, SEQ-NUM's 1-2 and D0 at the time STP arrives in the register's odd double-word part) and section 315a' shows the contents of the even PL double-word (the Q0-Q3 output sectors) at one later cycle of the lane clock when D1-D4 arrive in the next even double-word (e.g., DW2). At the same time that D1-D4 are present in PL register section 315a' (the Q0-Q3 output sectors), the adjacent D5'-D8' bytes (data group 306) will be stored in the Q4-Q7 output sectors of PL register 315. One clock cycle later, D9-D11, ..., Dx (data group 309, where Dx can be D12 or C0 in the illustrated case) will be present in the Q0-Q3 output sectors of register 315.

In FIG. 3B, the STP character is output from the Q4 output byte sector of PL register 315 and onto byte bus 356 as shown while the D0 data byte is output during the same cycle of the lane clock (321') from the Q7 output byte sector and onto byte bus 366 for temporary storage in register 325' (R4', where R4' is not necessarily the same byte storing register as R4 of FIG. 3A but can be in one embodiment). At the same time, the two sequence number bytes are output onto byte buses 357 and 358 for respective routing to byte sectors S6 and S7 of transaction layer register 335.

The D1 through D4 data bytes are output during a next clock cycle respectively from the Q0'-Q3' output byte sectors to the S1-S4 sectors of the transaction layer register 335 while the contents of R4' (e.g., the D0 byte) advance into TL sector S0. Thus, sectors S0-S4 respectively contain the TL-targeted data bytes, D0-D4. At the same time that bytes D1-D4 were stored into section 315a' of the PL register 315, bytes D5'-D7' (part of data group 306) were also stored into PL register section 315b. Thus, bytes D5'-D7' advance into sectors S5-S7 of the TL register 335 at the same time that D0-D4 respectively advance into S0-S4. Byte D8' of data group 306 is temporarily stored into intermediate register R4'. As a result, sectors S0-S7 respectively contain the TL-targeted data bytes, D0-D7 one clock cycle after STP and SEQ NUM's 1-2 are stored in TL register 335. In the next (third) cycle of the lane clock, D9-Dx will respectively emerge from the Q0'-Q3' output byte sectors while D8' emerges from the R4' temporary delay register for storage in the S0-S7 sectors of the TL register 335. It may be seen from study of FIG. 3B that TL register 335 will therefore receive the properly aligned and stripped bytes from the physical interface layer register 315 after the STP and SEQ NUM bytes pass through the TL register.

Figure 3C:
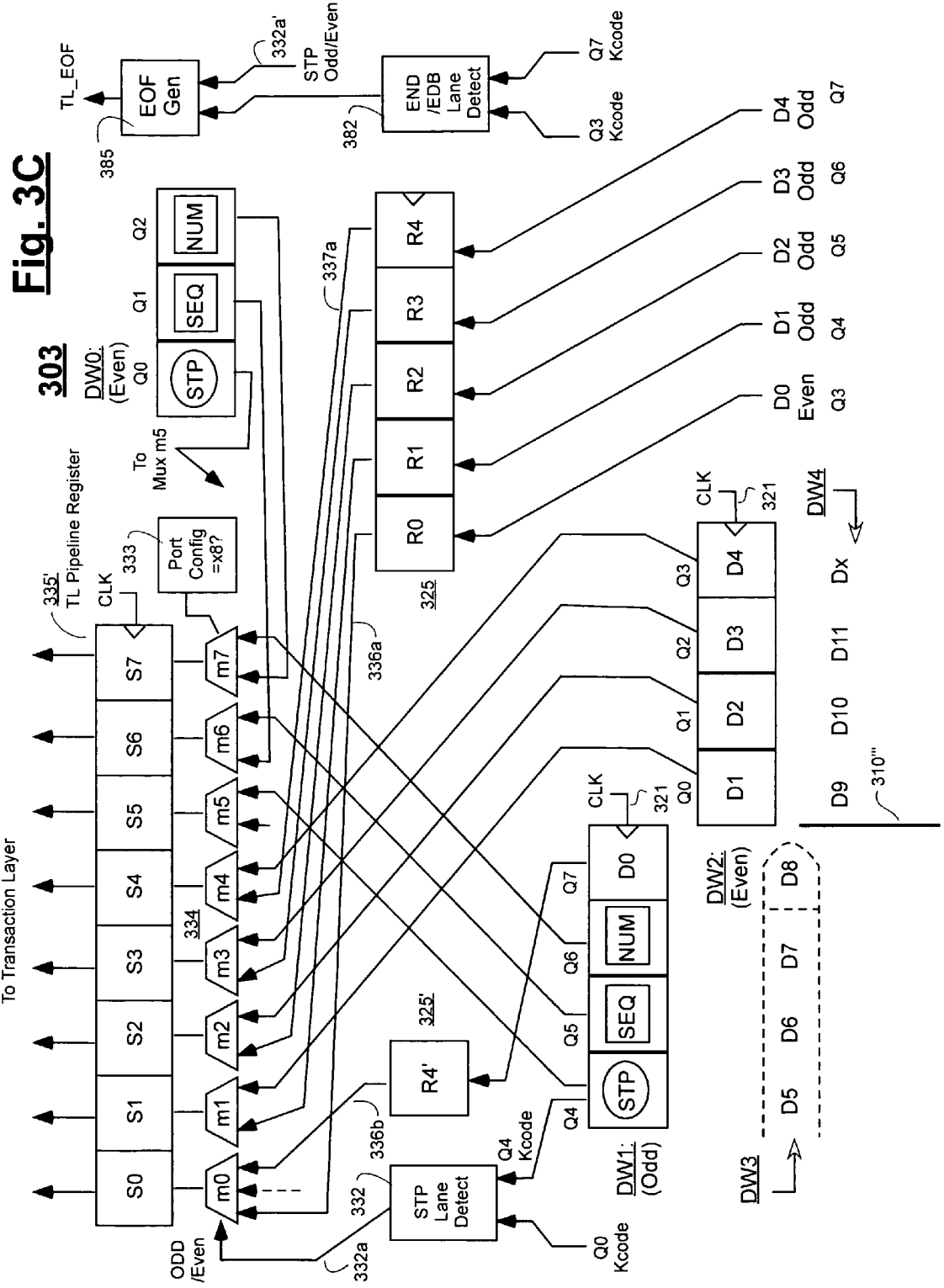
FIG. 3C is a schematic diagram of a third strip and align circuit that combines the functionalities of FIGS. 3A and 3B.

FIG. 3C is a schematic diagram of a third strip and align circuit 303 that combines the functionalities of FIGS. 3A and 3B. Register R4' (325') can be the same register as that redundantly shown at the R4 position of 325 but is shown separately for purpose of quicker correlation to its placement in FIG. 3B. R4' and R4 both receive their input data from the Q7 output sector of PL register 315. However, R4' and R4 pass their output(s) to S0 and S4 respectively via byte buses 336b and 337a. A set, 334 of eight multiplexers, m0 through m7, are interposed between the inputs of the TL register 335' and the outputs of registers 315 (Q0-Q7) and 325 (R0-R4) for properly routing the byte data depending on whether the permutation of FIG. 3A is in effect or the permutation of FIG. 3B is in effect. Unit 332 detects whether the STP special code (a so-called kcode) was in lane 0 or in lane 4 or not present in either lane. In response, unit 332 (STP lane detector) supplies an ODD/Even signal 332a at the appropriate clock cycle to all of multiplexers m0-m7 for directing traffic to the multiplexer output nodes from the respective left multiplexer input nodes if Even and from the respective right ones if ODD so as to implement the respective data routing pattern of FIG. 3A (STP in Even DW) or of FIG. 3B (STP in Odd DW) based on the arrival alignment of the corresponding STP character.

Multiplexers m0-m7 (set 334) need not each have just two input nodes per multiplexer as shown. Each can have many more inputs for routing data each to its corresponding one of TL byte sectors S0-S7. This is implied by the additional dashed input shown for m0. The illustrated routing through multiplexers m0-m7 occurs when the corresponding port configuration is a by-eight lanes one. Unit 333 further couples to the input select controls of multiplexers m0-m7 for activating the illustrated set of routing choices if the corresponding port configuration is determined by unit 333 to be a ×8 one. Otherwise, unit 333 may control the input select controls of multiplexers m0-m7 for activating a different set of routing choices if the corresponding port configuration is not a ×8 one. Accordingly, the illustrated circuit 303 uses unit 333 (port config detector) to determine whether its respective port is in a by-eight lane configuration or not, and then if yes, the circuit uses unit 332 (STP lane detector) to determine if the STP character arrived in lane 0 or lane 4 of the physical layer portion of the ×8 configured port.

The aligned data outputs of TL byte sectors S0-S7 (register 335') continue on into the transaction layer for further processing. In some embodiments it is desirable to provide the transaction layer circuitry with indicator flags for indicating when valid data bytes are present in register 335' (when TL_valid is true); when the start (D0) of a data string is present in byte sector S0 (when TL_sof is true); when the end (Dx) of a packet data string is present in register 335' and whether that end byte (Dx) is in byte sector S3 (in the odd DW) or S7 (in the even double-word). With regard to the last two indications (namely, when Dx is present, and where it is located), an additional TL_EOF-generating circuit 385 is shown in FIG. 3C for providing such an indication.

Generation of the TL_EOF-indicating signal (2 bits) relies on two independent pieces of input information: (1) was the corresponding STP character in the odd or even double-word? and (2) was the corresponding END or EDB character in the odd or even double-word? The STP ODD/Even signal 332a' is supplied to the TL_EOF-indicating circuit 385. Additionally, an END-or-EDB lane detector circuit 382 is included for supplying the TL_EOF-indicating circuit 385 with an indication of whether the corresponding END or EDB (bad data) character was in an odd or even double-word.

Specific logic for generating the TL_EOF-indicating signal (2 bits) may be found in the below Verilog style code. However, for better understanding, FIGS. 4A-4D are presented in conjunction with respective ones of the first through fourth input permutation states of FIGS. 2A-2D. FIG. 4A illustrates the case where ingress permutation number 1 (FIG. 2A) is presented to aligner unit 400. A 64 bit data bus carries two double-word per clock cycle to aligner 400 from the physical interface layer. In addition, either the physical interface layer and/or the data link layer supplies the aligner 400 with a PL_sof signal (2 bits) that indicates if STP is present in the PL register, and if so whether it arrived in lane 0 or lane 4. The aligner 400 is further supplied with a PL_valid signal (1 bit) indicating whether the physical layer register (315) has valid data in it or not. The aligner 400 is yet further supplied with a PL_eof signal (2 bits) that indicates if END is present in the PL register, and if so whether it arrived in lane 3 or lane 7. For the case of ingress permutation number 1 (FIG. 2A), the aligner 400 will have stripped out STP and the two sequence bytes as shown in grid 401, while placing D0 in the lane 0 position and also while having pulled the end byte, Dx=D15 three bytes back due to the stripping out of STP and the two sequence bytes. Accordingly, although the original end-of-frame (END) of the input physical layer packet (122 in FIG. 1) appeared at the lane-7 position of double-word 5 (DW5) in grid 401, the new end-of-frame for the transaction layer is D15 and it appears in the S7 position of DW3. Stated otherwise, strip-off of the STP, SEQ NUM bytes and CRC plus END bytes shifts the position of the end-of-frame for the TL payload data to be at least about one double-word closer to its start-of-frame than how close the END character is to its corresponding STP in the physical layer memory. (As will be seen in FIGS. 4C-4D, for the cases of odd STP arrival, the end-of-frame for the TL payload data will be about one and one half double-words closer to its start-of-frame. More importantly, the number of clock cycles between occurrence of the PL END character and the TL end-of-frame condition changes. FIG. 4D shows a 2 cycle look-ahead while FIGS. 4A-4C represent a one cycle look-ahead for generating the TL_eof flag in a timely manner.)

FIG. 4A shows the aligner 400 as outputting a two-bit end-of-frame signal, TL_eof {1:0} that indicates when the last valid byte of the TL packet is present and whether that last valid byte (D15 in the illustrated example) is located in the S7 position or in the S3 position. For example, TL_eof {1:0}=00 may indicate that eof is not yet present while TL_eof {1:0}=10 may indicate present in the even side of the TL register and TL_eof {1:0}=01 may indicate present in the odd side. The aligner 400 further outputs a 1 bit TL_sof signal which indicates the clock cycle when a valid D0 or start of frame byte is present. The aligner 400 may optionally further output a 1 bit TL_datavalid signal which indicates when S0-S7 contain valid data bytes. (Generally, TL_datavalid may be derived from TL_sof and TL_eof {1:0} since data is generally valid between the assertions of those start and end-of-frame signals provided the packet contains contiguous payload data.)

FIG. 4B is similar to FIG. 4A except that it shows the aligner 400 data output for the ingress permutation case number 2 of FIG. 2B. End byte D11 is in lane 3 of DW2 whereas the original END character was in lane 3 of DW4. FIG. 4C is similar to FIG. 4A except that it shows the aligner 400 data output for the ingress permutation case number 3 of FIG. 2C. End byte D11 is in lane 3 of DW2 whereas the original END character was in lane 7 of DW5. FIG. 4D is similar to FIG. 4A except that it shows the aligner 400 data output for the ingress permutation case number 4 of FIG. 2D. End byte D15 is in lane 7 of DW3 whereas the original END character was in lane 3 of DW6. Note that in FIG. 4D, there is a two row separation, and hence a 2 clock cycle separation between occurrence of the END character in the PL register (315) and occurrence of the D15 last byte in the TL register (335). Hence the TL_eof generating circuit should perform a 2 cycle look ahead for the case of FIG. 4D whereas a one cycle look ahead is sufficient for FIGS. 4A-4C. It may be appreciated from the combination of FIGS. 4A-4D that there are four possible variations on how the end-of-frame situation develops for the transaction layer stage and that at least one possibility (FIG. 4D) places stringent demands on how quickly the TL_eof signal should be generated.

Verilog Code

The below code for implementing an aligner in a PCI-Express environment in accordance with the disclosure is written in a Verilog code style. Some of the variable names may be slightly different from those presented elsewhere in this disclosure. For example, the timing designation "z0" generally indicates a signal that is valid in synchronism with corresponding clocking of data into the PL register of the physical layer (PL). More specifically, in the below code it will be seen that tlp_rx_data_z0[63:0] represents the contents of the 64 bit PL register at a corresponding time point z0; tlp_rx_sof_z0[1:0] indicates presence and location of the STP character at a corresponding time point z0; tlp_rx_eof_z0[1:0] indicates presence and location of the END or EDB character at a corresponding time point z0; and tlp_rx_valid_z0 indicates presence of valid physical layer data bytes in the PL register at a corresponding time point z0.

Similarly, the timing designation "z1" indicates a signal that is valid in synchronism with corresponding clocking of data into the R0-R4 register of the intermediate layer. More specifically, in the below code it will be seen that tlp_rx_data_z1 represents the contents of the 40 bit intermediate register at a corresponding time point z1. Aligner output data signals are expected to be valid at the time of their output for clocking them into the TL register of the transaction layer. More specifically, in the below code it will be seen that register definition, reg [63:0] tlp_rx_data defines the input of the 64 bit TL register that receives the re-aligned data output of the aligner. Persons skilled in the art should have no reasonable difficulty in determining which is which, in view of the disclosure taken in whole. Before proceeding to the detailed code, the basic input and output variables of the aligner are defined and then the circuit implementation equations for producing the output signals from the supplied input signals are provided. Also, although the embodiment in the drawings shows just three pipeline stages (the PL register 315, the intermediate R0-R4 register 325, and the TL register 325), it is possible to use more layers of pipeline so as to meet more stringent timing demands of a given application. Thus the Verilog code allows for a greater number of pipeline layers.

Output signal, Tlp_rx_nullify is derived at least from the error checking results provided by the CRC checking circuit and it is asserted to the transaction layer circuitry in the clock cycle when Tlp_rx_eof (end of frame, see below) is also asserted. The data link layer CRC check provides its indication as to whether a data error was detected or not in response to the CRC check bytes output by the PL register. In one embodiment, Tlp_rx_nullify is also asserted in that one clock cycle when Tlp_rx_eof is asserted if an EDB character was detected in the PL register in place of an END character thereby also indicating a need to nullify the just received payload data. It is to be understood that the CRC check function provides its pass or fail result signal within one clock cycle of the CRC bytes being valid in the PL register. Conventional combinatorial logic may be used to implement such a one cycle CRC check for the four bytes of CRC code plus the covered data bytes. The logic for incorporating the assertion of Tlp_rx_nullify in response to detection of EDB is not included in the below Verilog code in order to keep the code simple. Those skilled in the art will know how to insert the conditional code for asserting Tlp_rx_nullify at the correct clock cycle in response to EDB having been detected in the PL register irrespective of whether the CRC check indicates a good or bad check result.

Output signal, Tlp_rx_sof (start of frame) is asserted during the clock cycle when a valid D0 appears in the S0 position of the TL register 335'. The corresponding PL_sof signal (also designated in below code as tlp_rx_sof_z0[1:0]) is asserted in the cycle when the corresponding STP symbol shows up in the even or odd side of the PL register 315.

Output signal, Tlp_rx_eof (end of frame) is a 2 bit signal that remains unasserted (00) until the clock cycle when a valid last byte (Dx) appears in the S3 or S7 position of the TL register 335' and then one of the 01 and 10 bit sequences indicates end-of-frame is occurring and indicates whether the valid last byte (Dx) appears in the S3 or S7 position. PL_eof is a two bit input signal (also designated in below code as register signal tlp_rx_eof_z0[1:0]) determined by the clock cycle when the END appears in the PL register 315 and it also indicates the END symbol position (or EDB symbol position) as odd or even (DW0 or DW1).

Output signal, Tlp_rx_valid is asserted while the TL register 335' contains valid payload data bytes. In one embodiment, Tlp_rx_valid is asserted one clock cycle after valid data enters the R0-R4 intermediate register 325 and Tlp_rx_valid is de-asserted in response to the switching from 0 to 1 of an intermediate registration signal identified as unaln_tlp_eof10_z0 (where the "10" of the latter signal indicates that a physical layer end-of-frame symbol (END or EDB) was detected in the even double-word side of the PL register). Just as generation of the Tlp_rx_eof signal uses look-ahead functionality, generation (including de-assertion) of the Tlp_rx_valid signal uses a look-ahead functionality so that Tlp_rx_valid goes low in synchronism with the end of the stripped and re-aligned payload data in the TL register.

Begin Definition of Aligner Inputs and Outputs

```
module dl_alignment
    (
        clk,
        reset_n,
        phy_rx_data,
        phy_rx_data_valid,
        lane_0_is_kcode,
        lane_4_is_kcode,
        lane_3_is_kcode,
        lane_7_is_kcode,
        crc_check_failed,
        tlp_rx_data,
        tlp_rx_sof,
        tlp_rx_eof,
        tlp_rx_valid,
        tlp_rx_nullify
    );
input    clk;
input    reset_n;
// Assume phy_rx_data[63:56] is lane 0
//       phy_rx_data[55:48] is lane 1
//       phy_rx_data[47:40] is lane 2
//       phy_rx_data[39:32] is lane 3
//       phy_rx_data[31:24] is lane 4
//       phy_rx_data[23:16] is lane 5
//       phy_rx_data[10:08] is lane 6
//       phy_rx_data[07:00] is lane 7
input [63:0] phy_rx_data;
input    phy_rx_data_valid;
```

```
input     lane_0_is_kcode;
input     lane_4_is_kcode;
input     lane_3_is_kcode;
input     lane_7_is_kcode;
input     crc_check_failed;
//Output of aligner to transaction layer
output [63:0] tlp_rx_data;
output    tlp_rx_sof;
output [1:0] tlp_rx_eof;
output    tlp_rx_valid;
output    tlp_rx_nullify;
//Special kcode symbols defined
parameter STP   = 8'hfb;   // Start of TLP (K27.7)
parameter END   = 8'hfd;   // End of TLP (K29.7)
//Input to the alginer can be derived by data link layer or by phy layer
//Inputs to the aligner are tlp_rx_sof_z0[1:0],
//           tlp_rx_eof_z0[1:0],
//           tlp_rx_valid_z0, and
//           tlp_rx_data_z0[63:0],
reg [1:0] tlp_rx_sof_z0;
reg [1:0] tlp_rx_eof_z0;
wire      tlp_rx_valid_z0;
wire [63:0] tlp_rx_data_z0;
//Output from the aligner are following 5 signals
reg       tlp_rx_sof;
wire [1:0] tlp_rx_eof;
reg       tlp_rx_valid;
reg [63:0] tlp_rx_data;
wire      tlp_rx_nullify;
//Following signals defined are intermediate signals
reg       tlp_rx_sof_z1;
reg       tlp_rx_eof_z1;
reg       tlp_rx_valid_z1;
reg [39:0] tlp_rx_data_z1;
wire      tlp_rx_eof_z1_prev;
reg       aligned_tlp;
reg       unaligned_tlp;
reg       aligned_tlp_lch;
wire      algnd_tlp;
reg       algnd_tlp_d;
wire      unaln_tlp_eof10_z0;
wire      unaln_tlp_eof01_z0;
wire      aln_tlp_eof10_z0;
wire      aln_tlp_eof01_z0;
//Rename inputs
   assign tlp_rx_valid_z0 = phy_rx_data_valid;
   assign tlp_rx_data_z0 = phy_rx_data;
         //Determine whether the STP is aligned or not
//Also generate sof for the packet coming to data link layer
   always @ (tlp_rx_valid_z0 or tlp_rx_data_z0[63:0] or lane_0_is_kcode or
lane_4_is_kcode)
      if (tlp_rx_valid_z0 && lane_0_is_kcode && tlp_rx_data_z0[ 63: 56] == STP)
         begin
            aligned_tlp = 1'b1;
            unaligned_tlp = 1'b0;
            tlp_rx_sof_z0[1:0] = 2'b10;
         end
      else if (tlp_rx_valid_z0 && lane_4_is_kcode && tlp_rx_data_z0[31:24] == STP)
         begin
            aligned_tlp = 1'b0;
            unaligned_tlp = 1'b1;
            tlp_rx_sof_z0[1:0] = 2'b01;
         end
      else
         begin
            aligned_tlp = 1'b0;
            unaligned_tlp = 1'b0;
            tlp_rx_sof_z0[1:0] = 2'b00;
         end
//Create a latch flag for aligned STP case
   always @(posedge clk or negedge reset_n)
      if (!reset_n)
         aligned_tlp_lch <= 1'b0;
      else if (aligned_tlp)
         aligned_tlp_lch <= 1'b1;
      else if (unaligned_tlp)
         aligned_tlp_lch <= 1'b0;
//Signal for the generation of multiplex control of aligner data path output
   assign algnd_tlp = (aligned_tlp || (aligned_tlp_lch && ~unaligned_tlp));
//Signal used to control the multiplex of aligner data path output
```

```
-continued always @( posedge clk or negedge reset_n)
        if (!reset_n)
            algnd_tlp_d <= 1'b0;
        else
            algnd_tlp_d <= algnd_tlp;
//Generation of eof for the packet coming to data link layer
    always @ (tlp_rx_valid_z0 or tlp_rx_data_z0[63:0] or lane_3_is_kcode or
lane_7_is_kcode)
        if (tlp_rx_valid_z0 && lane_3_is_kcode && tlp_rx_data_z0[39:32] == END)
            tlp_rx_eof_z0[1:0] = 2'b10;
        else if (tlp_rx_valid_z0 && lane_7_is_kcode && tlp_rx_data_z0[7:0] == END)
            tlp_rx_eof_z0[1:0] = 2'b01;
        else
            tlp_rx_eof_z0[1:0] = 2'b00;
//Signals to be used for the generation of aligner outputs
    assign unaln_tlp_eof10_z0 = ~aligned_tlp_lch && (tlp_rx_eof_z0 == 2'b10);
    assign unaln_tlp_eof01_z0 = ~aligned_tlp_lch && (tlp_rx_eof_z0 == 2'b01);
    assign aln_tlp_eof10_z0 = aligned_tlp_lch && (tlp_rx_eof_z0 == 2'b10);
    assign aln_tlp_eof01_z0 = aligned_tlp_lch && (tlp_rx_eof_z0 == 2'b01);
            //////////////////////////////////////////////////////////
///////////////// Generation of aligner output tlp_rx_sof /////////////
//////////////////////////////////////////////////////////////////////
        always @( posedge clk or negedge reset_n)
        if (!reset_n)
            tlp_rx_sof_z1 <= 1'b0;
        else
            tlp_rx_sof_z1 <= (tlp_rx_sof_z0[1] || tlp_rx_sof_z0[0]) ?
                    1'b1 ://sof of aligner output is always aligned
                    1'b0 ;
    always @( posedge clk or negedge reset_n)
        if (!reset_n)
            tlp_rx_sof <= 1'b0;
        else
            tlp_rx_sof <= tlp_rx_sof_z1;
            //////////////////////////////////////////////////////////
///////////////// Generation of aligner output tlp_rx_eof /////////////
//////////////////////////////////////////////////////////////////////
        assign tlp_rx_eof_z1_prev =
                ( aln_tlp_eof10_z0) ? 2'b10 : //skip 1 pipe case
                ( aln_tlp_eof01_z0) ? 2'b01 : //skip 1 pipe case
                (unaln_tlp_eof01_z0) ? 2'b10 : //skip 1 pipe case
                (unaln_tlp_eof10_z0) ? 2'b00 : //skip 2 pipes case
                        2'b00 ;
    always @( posedge clk or negedge reset_n)
        if (!reset_n)
            tlp_rx_eof_z1 <= 1'b0;
        else
            tlp_rx_eof_z1 <= tlp_rx_eof_z1_prev;
    assign tlp_rx_eof = unaln_tlp_eof10_z0 ? 2'b01 :
                        //skip 2 pipes case
                        tlp_rx_eof_z1 ;
                        //skip 1 pipe case
            //////////////////////////////////////////////////////////
///////////////// Generation of aligner output tlp_rx_valid ///////////
//////////////////////////////////////////////////////////////////////
    always @( posedge clk or negedge reset_n)
        if (!reset_n)
            tlp_rx_valid_z1 <= 1'b0;
        else
            tlp_rx_valid_z1 <= (tlp_rx_eof_z0[1] || tlp_rx_eof_z0[0]) ?
                    1'b0 :
                        //for both skip 1 pipe and skip 2 pipes cases
                    tlp_rx_valid_z0;
    always @( posedge clk or negedge reset_n)
        if (!reset_n)
            tlp_rx_valid <= 1'b0;
        else
            tlp_rx_valid <= unaln_tlp_eof10_z0 ?
                    1'b0 :
                        //for skip 2 pipes case
                    tlp_rx_valid_z1;
            //////////////////////////////////////////////////////////
///////////////// Generation of aligner output tlp_rx_data ////////////
//////////////////////////////////////////////////////////////////////
//shift out 3 bytes (1 byte STP, 2 bytes seq number)
//shift out 7 bytes (1 byte STP, 2 bytes seq number, 4 bytes of data)
    always @(posedge clk)
        tlp_rx_data_z1[39:00] <= tlp_rx_data_z0[39:00];
//Aligner output data path is controlled by a multiplex
    always @(posedge clk)
```

-continued

```
    tlp_rx_data[63:0] <= (algnd_tlp_d) ?
        {tlp_rx_data_z1[39:00], tlp_rx_data_z0[63:40]}
                //Repack data after being shifted 3 bytes
        :
        {tlp_rx_data_z1[07:00], tlp_rx_data_z0[63:08]};
                //Repack data after being shifted 7 bytes
    /////////////////////////////////////////////////////////////
    ///////////////// Generation of aligner output tlp_rx_nullify //////////
    /////////////////////////////////////////////////////////////
    assign tlp_rx_nullify = crc_check_failed ? 1'b1 : 1'b0;
endmodule
        <end of Verilog code>
```

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of example of one extension of the disclosure, in some applications it may be desirable to insert additional pipelined delay stages so that more controlled timing is provided for the look ahead determination of where and when the TL end-of-frame (TL_eof) occurs relative to the PL END character being detected. In some applications it may be desirable to insert additional pipelined stages in the PL so that one PL register (e.g., 315) does not have its output fanout overtaxed by having too many byte buses leading out from the one PL register (e.g., 315) to various circuits that use the data of the PL register, the disclosed aligner 400 (FIG. 4A) being just one of such various circuits.

By way of another example of how the disclosed system can be insubstantially modified, note that all three of the TL_sof, TL_validdata and TL_eof are not necessary if the payload section inside every packet is continuous. TL_sof and TL_valid could be combined into a single bit (call it, TL_valid_sof) which switches from 0 to 1 when the start-of-frame begins in the transaction layer register and which remains as 1 until the end-of-frame is reached. If the payload data is continuous when in ×8 lane mode, then the end-of-frame can be signaled by TL_valid_sof switching from 1 to 0; and at the same time, the state of an additional bit, TL_eof_odd_even can be used to signal whether the end-of-frame is in the odd or even double-word side of the TL register (335). Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A machine-implemented method comprising:
   realigning packet data for a transaction layer (TL) of a reconfigurable communications port in response to arrival of not-yet-stripped packet data in a physical layer (PL) of the communications port by selecting one of two different realignment modes for one of two data states in a by-eight aggregated lanes mode in response to:
   (a) determining that the reconfigurable communications port is in a by-eight aggregated lanes mode; and
   (b) determining that an STP (start of packet) character of a not-yet-stripped packet data is disposed in a first data state in an even double-word side of the physical layer memory or in a second data state in in an odd double-word side of the physical layer memory.

2. The machine-implemented method of claim 1 wherein said reconfigurable communications port is a PCI-Express port.

3. The machine-implemented method of claim 1 and further comprising:
   (c) in a first realignment mode in response to said determining indicating that the STP character is disposed in a first data state in the even double-word side of the physical layer memory, routing a first predefined number of leading bytes disposed in the even double-word side of the PL memory, where said first predefined number of leading bytes are not targeted for use by the transaction layer, directly to a transaction layer memory while routing a second predefined number of next-successive bytes disposed in the PL memory, where said second predefined number of bytes are targeted for use by the transaction layer, to a first intermediate delay memory; and (d) in a second realignment mode in response to said determining indicating that the STP character is disposed in a second data state in the odd double-word side of the PL memory, routing said first predefined number of bytes disposed in a leading position of the odd double-word side of the PL memory directly to the transaction layer memory while routing a third predefined number of next-successive bytes disposed the PL memory, where said third predefined number of bytes is or are targeted for use by the transaction layer, to the first intermediate delay memory or to an alternative delay memory; and subsequently routing in a next clock cycle, a fourth predefined number of bytes from the PL memory directly to the transaction layer memory.

4. The machine-implemented method of claim 3 and further comprising:

(e) when said first predefined number of bytes disposed in a leading position of the even or odd double-word side of the PL memory are routed from the PL memory and directly into the TL memory, first flagging to the transaction layer that the routed first predefined number of bytes constitute invalid data which are to be ignored by the transaction layer.

5. The machine-implemented method of claim 4 and further comprising:

(f) second flagging to the transaction layer that a last valid payload data byte is present in the TL memory when a last of payload bytes from the not-yet-stripped packet data that is targeted for the transaction layer is routed to TL memory and further indicating whether said last valid payload data byte is an even double-word side or an odd double-word side of the TL memory.

6. The machine-implemented method of claim 3 and further comprising:

(e) routing further payload bytes of the not-yet-stripped packet data from the PL memory and into the TL memory using at least one of routing means used in said steps (c) and (d); and (f) when said further routed payload bytes are targeted for the transaction layer, flagging to the transaction layer that the further routed payload characters constitute valid payload data.

7. The machine-implemented method of claim 3 wherein said first predefined number is three and said second predefined number is five.

8. The machine-implemented method of claim 3 wherein said third predefined number is one and said fourth predefined number is seven.

9. A packet data stripping and re-aligning circuit for use with a reconfigurable communications port having a physical layer (PL) that deserializes received packets and a transaction layer (TL) that process data bytes embedded in the deserialized packets, the circuit comprising:

(a) a port configuration detector that outputs a first indication of when the reconfigurable communications port is in a by-eight aggregated lanes mode;

(b) an STP arrival detector that outputs a second indication of whether a start-of-frame symbol of a deserialized packet produced by the physical layer is disposed in an even double-word side or an odd double-word side of an eight lane storage unit of the physical layer;

(c) a delay register operatively interposed between the eight lane storage unit and the transaction layer for delaying a subset of deserialized packet bytes stored in the eight lane storage unit as they are routed from the eight lane storage unit to the transaction layer; and (d) a plurality of multiplexers responsive to the second indication and operative to provide a first selective routing of bytes to the transaction layer from the combination of the eight lane storage unit and the delay register when the STP arrival detector indicates disposition of an STP character in the odd double-word side, and to provide a different, second selective routing of bytes to the transaction layer from the combination of the eight lane storage unit and the delay register when the STP arrival detector indicates disposition of an STP character in the even double-word side.

10. The packet data stripping and re-aligning circuit of claim 9 wherein said reconfigurable communications port is a PCI-Express port.

11. The packet data stripping and re-aligning circuit of claim 9 and further comprising:

(e) an END arrival detector that outputs a third indication of whether an end-of-frame symbol of a deserialized packet produced by the physical layer is disposed in an even double-word side or an odd double-word side of the eight lane storage unit of the physical layer; and (f) an end-of-frame flag generator coupled to the END arrival detector and to the STP arrival detector and using the second and third indications for generating a transaction layer flag signal indicating when a last data byte of the deserialized packet is sent to the transaction layer and whether the sent last data byte is disposed in an odd or even double-word side of a transaction layer memory receiving the sent last data byte.

12. A packets receiving device that can be embedded within a network having a plurality of configurable communication ports where data transfer rates of said ports are at least one time configurable, the device comprising:

(a) a physical layer (PL) register operative to receive deserialized packet characters including an STP character that indicates a start of a physical layer packet frame, at least one of an END or EDB character that indicates an end of the physical layer packet frame, sequence number characters and error check characters;

(b) a transaction layer (TL) register operative to receive packet data bytes embedded between said STP and END or EDB characters; and (c) a data re-aligner operative for stripping off said STP character and END or EDB character as well as said sequence number characters and error check characters and supplying the embedded data bytes to the TL register in re-aligned format such that a first of successive ones of the embedded data bytes aligns with a start of the TL register, (c.1) wherein for a by-eight aggregated lanes mode the data re-aligner includes a delay register that delays at least a subset of the embedded data bytes as they are supplied from the re-aligner to the TL register.

13. The packets receiving device of claim 12 wherein:

(c.2) the data re-aligner includes a plurality of multiplexers that are controlled by a first signal that is indicative of whether the STP character has been received in an even double-word side of the PL register or an odd double-word side of the PL register.

14. The packets receiving device of claim 13 wherein:

(c.2a) the multiplexers are further controlled by a second signal that is indicative of whether a configurable communication port associated with said PL and TL registers is in a by-eight aggregated lanes mode.

15. The packets receiving device of claim 13 wherein:

(C.3) the data re-aligner includes an end-of-frame flag generator that generates a flag signal indicating when a last data byte of the embedded data bytes that are targeted for the transaction layer, is stored in the transaction layer register.

16. The packets receiving device of claim 15 wherein:

(c.3a) the flag signal further indicates whether the last data byte of the embedded data bytes is stored in an even double-word side of the TL register or an odd double-word side of the TL register.

* * * * *